(12) United States Patent
Kurihara et al.

(10) Patent No.: US 11,388,857 B2
(45) Date of Patent: Jul. 19, 2022

(54) CUTTER BLADE AND LAWN MOWER

(71) Applicant: HONDA MOTOR CO., LTD., Tokyo (JP)

(72) Inventors: Mai Kurihara, Wako (JP); Fumio Minami, Wako (JP); Yuko Nishi, Wako (JP); Hiroshi Kobayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 523 days.

(21) Appl. No.: 16/473,315

(22) PCT Filed: Dec. 26, 2017

(86) PCT No.: PCT/JP2017/046542
§ 371 (c)(1),
(2) Date: Jun. 25, 2019

(87) PCT Pub. No.: WO2018/124021
PCT Pub. Date: Jul. 5, 2018

(65) Prior Publication Data
US 2020/0100426 A1    Apr. 2, 2020

(30) Foreign Application Priority Data

Dec. 27, 2016  (JP) .............................. JP2016-253093

(51) Int. Cl.
*A01D 34/73*  (2006.01)

(52) U.S. Cl.
CPC .................................. *A01D 34/73* (2013.01)

(58) Field of Classification Search
CPC ...... A01D 34/73; A01D 34/412; A01D 34/63; A01D 34/66; A01D 34/67; A01D 34/685
See application file for complete search history.

(56) References Cited

U.S. PATENT DOCUMENTS

| | | | | |
|---|---|---|---|---|
| 2,760,327 | A * | 8/1956 | Bovee ..................... | A01D 34/67 56/13.4 |
| 5,259,176 | A * | 11/1993 | Kahamura ............. | A01D 34/73 56/255 |
| 5,894,717 | A * | 4/1999 | Yamashita ............ | A01D 34/005 56/320.1 |
| 7,392,643 | B2 * | 7/2008 | Warashina ........... | A01D 34/005 56/17.5 |
| 10,285,328 | B2 * | 5/2019 | Kurioka ................. | A01D 34/73 |
| 2006/0042216 | A1 * | 3/2006 | Warashina ............. | A01D 34/73 56/255 |

(Continued)

FOREIGN PATENT DOCUMENTS

JP     2003-180118     7/2003

OTHER PUBLICATIONS

International Search Report, dated Apr. 3, 2018 (Apr. 3, 2008), 1 page.

*Primary Examiner* — Abigail A Risic
(74) *Attorney, Agent, or Firm* — Rankin, Hill & Clark LLP

(57) ABSTRACT

A cutter blade for a lawn mower has an upper blade and a lower blade. The upper blade has an upper blade base and an upper outer end positioned above and further radially outward than the upper blade base. The lower blade has a lower blade base and a mowing section positioned below and further radially outward than the lower blade base. The upper blade base overlaps the lower blade base.

11 Claims, 10 Drawing Sheets

(56) References Cited

U.S. PATENT DOCUMENTS

| | | | |
|---|---|---|---|
| 2007/0074497 A1* | 4/2007 | Myers | A01D 34/733 56/17.5 |
| 2015/0271997 A1* | 10/2015 | Kurioka | A01D 34/826 56/255 |
| 2015/0271998 A1* | 10/2015 | Kurioka | A01D 34/826 56/255 |
| 2017/0245426 A1* | 8/2017 | Kuriyagawa | A01D 34/6806 |
| 2020/0404840 A1* | 12/2020 | Xu | A01D 34/73 |
| 2021/0289697 A1* | 9/2021 | Kurihara | A01D 34/826 |
| 2021/0321564 A1* | 10/2021 | Yamaoka | A01D 34/733 |

* cited by examiner

CUTTER BLADE AND LAWN MOWER

TECHNICAL FIELD

The present invention relates to a cutter blade and a lawn mower.

BACKGROUND ART

Rotary lawn mowers cut lawn grass by rotating a cutter blade along lawn grass. In the lawn mowers, it is known that some rotary lawn mowers include a cutter blade having double blades, i.e., an upper blade and a lower blade (e.g. see the specification of U.S. Patent Application Publication No. 2006/0042216).

SUMMARY OF INVENTION

Some conventional cutter blades for the lawn mower have structure where ribs, etc. are provided for improvement of rigidity, in order to suppress displacement amount of the blade by the centrifugal force during rotation. However, when outer ends of the blade are displaced upward or downward by the centrifugal force generated during rotation of the cutter blade, the lawn mowing performance (finishing appearance) may be degraded undesirably, and when stress is generated as a result of displacement, the blade strength may be decreased undesirably.

The present invention has been made taking such a problem into account, and an object of the present invention is to provide a cutter blade including double blades and a lawn mower in which it is possible to effectively suppress displacement amount during rotation.

In order to achieve the above object, the present invention provides a cutter blade for a lawn mower, the cutter blade including an upper blade and a lower blade overlapped with each other in a thickness direction, wherein the upper blade includes an upper blade proximal part having a flat shape in a radial direction perpendicular to a blade rotation axis and an upper outer end positioned radially outside the upper blade proximal part, and above the upper blade proximal part, and the lower blade includes a lower blade proximal part having a flat shape in the radial direction, and a clipping part positioned radially outside the lower blade proximal part and below the lower blade proximal part, and wherein the upper blade proximal part is overlapped on the lower blade proximal part.

In the cutter blade of the present invention having the above structure, during rotation, by the influence of the centrifugal force, a force is applied to the upper blade to displace the upper blade downward, and a force is applied to the lower blade to displace the lower blade upward. Thus, the displacement of the upper blade and the displacement of the lower blade are suppressed mutually. Accordingly, it becomes possible to suppress the displacement amount during rotation of the cutter blade effectively. As a result, it become possible to improve the lawn mowing performance (in particular, finishing appearance), and thus suppress generation of the stress as a result of displacement.

The upper blade may include a rising part which rises from the upper blade proximal part toward the upper outer end, and the lower blade may include a falling part which falls from the lower blade proximal part to the clipping part, a portion where the rising part starts to rise from the upper blade proximal part is positioned radially outside a portion where the falling part starts to fall from the lower blade proximal part.

In the structure, during rotation of the cutter blade, the outermost portion of the lower blade in the radial direction of the lower blade proximal part and the upper blade proximal part push against each other. Therefore, it becomes possible to suppress the displacement amount of the lower blade during rotation of the cutter blade effectively to a greater extent.

In a blade rotation direction, one of a radially outer end of the upper outer end and a radially outer end of the clipping part may be positioned on a front side of another of the radially outer end of the upper outer end and the radially outer end of the clipping part.

In the structure, it is possible to suppress cancellation of the air flows (wind) generated by the upper outer end and the clipping part during rotation of the cutter blade. Accordingly, it becomes possible to efficiently generate the transportation wind for transporting the clipped lawn grass.

The lower blade includes a warping part rising from the clipping part in a direction opposite to the blade rotation direction, in a blade rotation direction, a radially outer end of the upper outer end may be positioned on the front side of the radially outer end of the clipping part.

In the structure, during rotation of the cutter blade, it is possible to suppress cancellation of the upward air flow generated by the warping part of the lower blade, by the air flow generated by the clipping part of the upper blade. Therefore, it becomes possible to generate the transportation wind more efficiently.

A blade part may be formed in at least part of a front edge in a blade rotation direction of the upper outer end.

In the structure, by clipping the lawn grass not only by the lower blade but also by the upper blade, it is possible to finely cut the lawn grass in comparison with the case of clipping the lawn grass only by the lower blade. Therefore, even in the case of transporting long lawn grass and/or heavy lawn grass, the clipped lawn grass rides on the transportation wind easily, and the lawn grass can be transported easily on the transportation wind more efficiently.

The lower blade may include a falling part formed between the lower blade proximal part and the clipping part, the falling part being curved downward from the lower blade proximal part toward the radial outside, and a warping part formed to rise from the clipping part in a reverse rotation direction which is a direction opposite to the blade rotation direction, and wherein the falling part and the warping part may include an intersection part where an end of the falling part in the reverse rotation direction and an end of the warping part positioned radially inside intersect with each other.

In the structure, it becomes possible to catch long lawn grass and/or heavy lawn grass clipped by the clipping part in the intersection part where the falling part and the warping part intersect with each other. Therefore, after the clipped part is temporarily caught in the intersection part, it becomes possible to transport the clipped lawn grass efficiently.

The intersection part may include a cup shaped portion on an upper surface of the cutter blade, and the cup shaped portion may be recessed toward a lower surface of the cutter blade.

In the structure, it becomes possible to catch long lawn grass and/or wet heavy lawn grass clipped by the blade part more easily in the intersection part.

The cup shaped portion may have a spherical surface.

In the structure, it becomes possible to catch long lawn grass and/or wet heavy lawn grass clipped by the clipping part in the intersection part.

A shape of a marginal portion of the cutter blade in the intersection part may have an arc shape as viewed in a direction of the blade rotation axis.

In the structure, it becomes possible to reduce the air resistance during rotation of the blade, and reduce noises such as wind noises.

The warping part may have a twisted shape which rises upward in the reverse rotation direction, and which is curved radially inward.

In the structure, it is possible to generate the transportation wind more efficiently.

Further, the present invention provides a lawn mower including a cutter blade, the cutter blade including an upper blade and a lower blade overlapped with each other in a thickness direction, wherein the upper blade includes an upper blade proximal part having a flat shape in a radial direction perpendicular to a blade rotation axis, and an upper outer end positioned radially outside the upper blade proximal part, and above the upper blade proximal part, and the lower blade includes a lower blade proximal part having a flat shape in the radial direction, and a clipping part positioned radially outside the lower blade proximal part and below the lower blade proximal part, and wherein the blade proximal part is overlapped on the lower blade proximal part.

In the lawn mower, the lower blade may include a falling part formed between the lower blade proximal part and the clipping part, the falling part being curved downward from the lower blade proximal part, toward the radially outside, and a warping part formed to rise from the clipping part in a reverse rotation direction which is a direction opposite to a blade rotation direction, and wherein the falling part and the warping part may include an intersection part where an end of the falling part in the reverse rotation direction and an end of the warping part positioned radially inside intersect with each other.

In the cutter blade and the lawn mower of the present invention, it becomes possible to effectively suppress displacement amount during rotation of the cutter blade.

DESCRIPTION OF EMBODIMENTS

Figure 1:
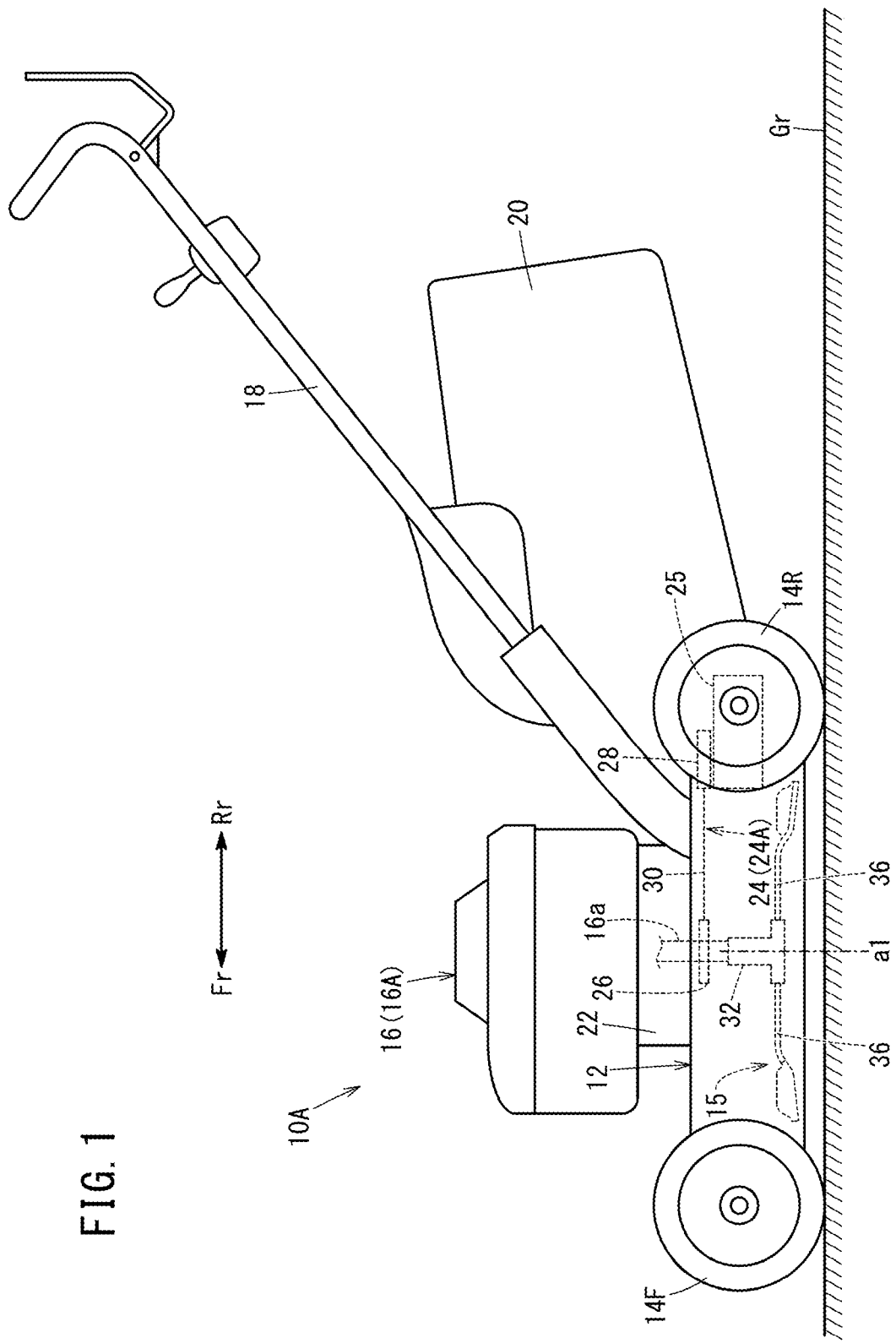
FIG. 1 is a side view showing a lawn mower.
Figure 2:
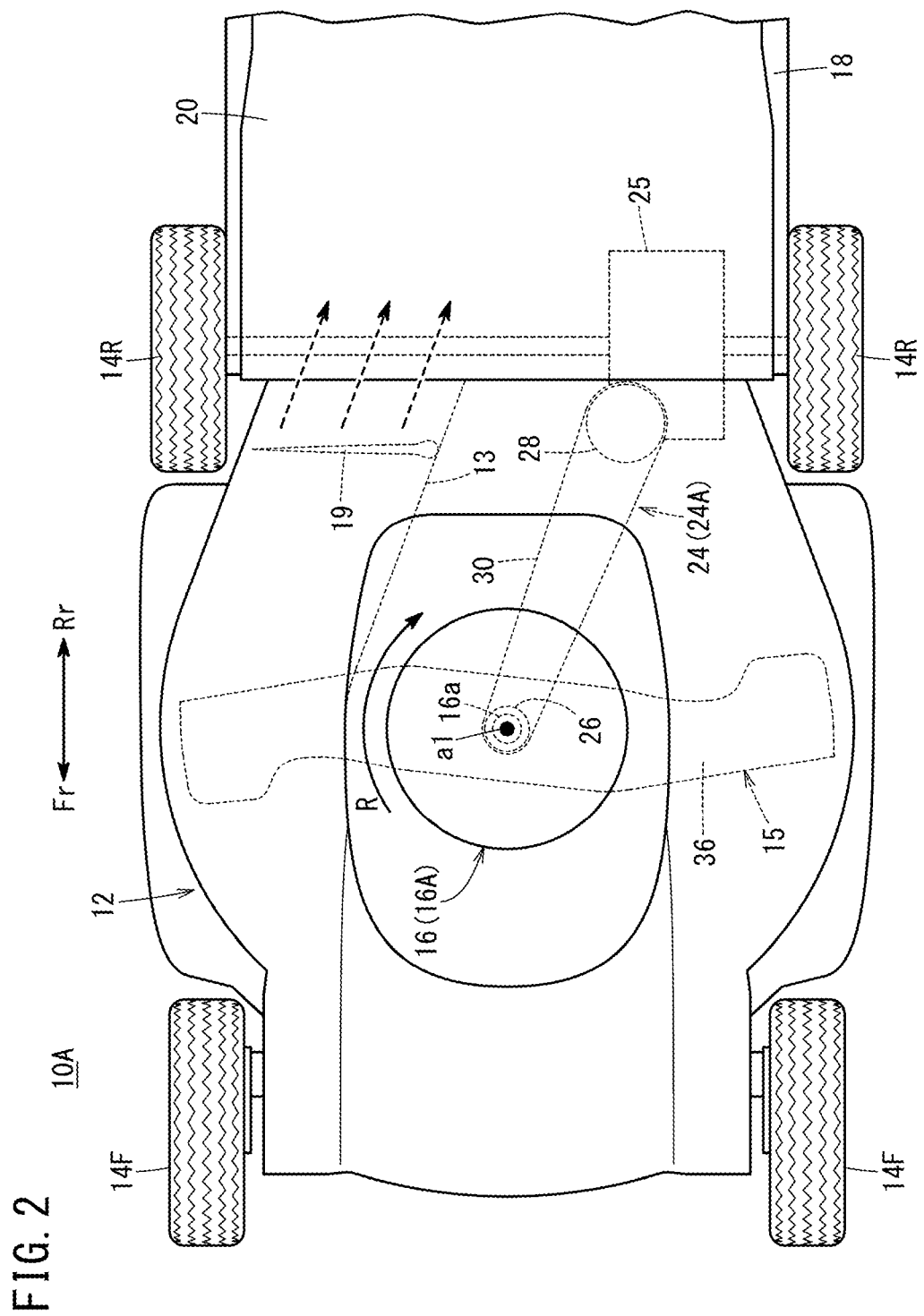
FIG. 2 is a plan view showing the lawn mower.
Figure 7:
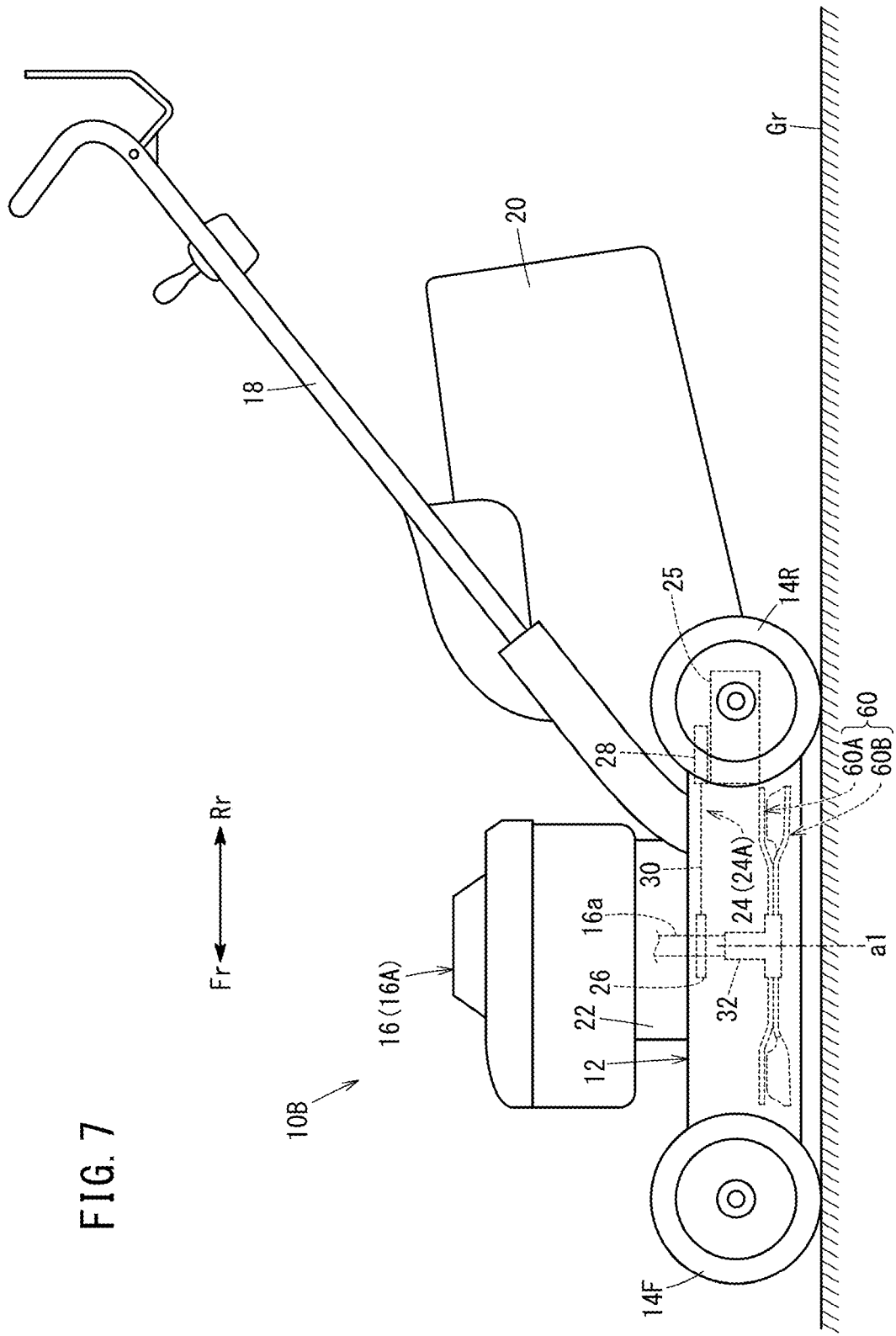
FIG. 7 is a side view showing a lawn mower having another structure.

A lawn mower 10A shown in FIGS. 1 and 2 is a walk-behind, self-propelled working machine for cutting lawn grass. In FIGS. 1 and 2, an arrow Fr denotes the front side (same as the front side as viewed from an operator) of the lawn mower 10A, and an arrow Rr denotes the rear side (same as the rear side as viewed from the operator) of the lawn mower 10A. (Also in FIG. 7 showing a lawn mower 10B having another structure, the arrow Fr denotes the front side of the lawn mower 10B, and the arrow Rr denotes the rear side of the lawn mower 10B).

The lawn mower 10A includes a housing 12 as a machine body, left and right front wheels 14F provided on the front side of the housing 12, left and right rear wheels 14R provided on the rear side of the housing 12, a cutter blade 15 accommodated inside the housing 12 for cutting lawn grass, a prime mover 16 provided above the housing 12, and a control handle 18 extending backward from the housing 12.

As shown in FIG. 2, in a plan view, the lawn mower 10A rotates the cutter blade 15 clockwise (in the direction indicated by an arrow R) by the prime mover 16 to cut (clip) the lawn grass under the lawn mower 10A. At this time, the lawn mower 10A generates flows of the air (swirl air flow or swirl wind) in the housing 12 swirling in the same direction as the cutter blade 15. By this swirl air flow, the lawn grass cut by the cutter blade 15 can be delivered to, and stored in a grass clippings container 20 through a grass clippings discharge passage 13 formed in the housing 12. Hereinafter, the lawn grass cut (clipped) by the cutter blade 15 will also be referred to as the "grass clippings". Further, the "swirl air flow" will also be referred to as the "transportation wind".

In FIG. 1, the housing 12 is a casing having an opened bottom where only the surface facing the lawn ground Gr under the housing 12 is opened. The housing 12 has a scroll section having a spiral shape in a plan view, for placing the lawn grass cut by the cutter blade 15 on the transportation wind, and transporting the lawn grass (grass clippings) toward the grass clippings discharge passage 13.

As shown in FIG. 2, a mode switch damper 19 is provided for the grass clippings discharge passage 13. The mode switch damper 19 can be operated by a control lever (not shown). By switching the open/closed state of the mode switch damper 19, it is possible to selectively switch the operating mode, between a bagging mode for storing the grass clippings in the grass clippings container 20 and a mulching mode for discharging the grass clippings to a position below the housing 12.

In FIG. 1, a prime mover base 22 is attached to an upper surface of the housing 12. The prime mover 16 is attached to an upper surface of the prime mover base 22. In the lawn mower 10A, an engine 16A is mounted as the prime mover 16. It should be noted that the prime mover 16 is not limited to the engine 16A. For example, the prime mover 16 may be an electric prime mover. The prime mover 16 has an output axis 16a. The output axis 16a protrudes downward, and extends into the housing 12. The output axis 16a is substantially perpendicular to the ground Gr. Therefore, in the case where the lawn mower 10A is present on the horizontal ground Gr, the output axis 16a is rotated about the rotation core which is substantially perpendicular to the horizontal plane.

The driving power generated by the prime mover 16 is transmitted to the left and right rear wheels 14R as traveling driving power, through a traveling power transmission mechanism 24 and a transmission 25 coupled to the output axis 16a. Therefore, the left and right rear wheels 14R are provided as drive wheels. In the lawn mower 10A, the traveling power transmission mechanism 24 is in the form of a belt mechanism 24A. The belt mechanism 24A includes a drive pulley 26 fixed to the output axis 16a, a driven pulley 28 coupled to the transmission 25, and a drive belt 30 wound around the drive pulley 26 and the driven pulley 28. As the transmission 25, for example, a hydraulic continuously variable transmission may be used.

The cutter blade 15 is coupled to the output axis 16a of the prime mover 16. The rotation driving power is transmitted from the output axis 16a to the cutter blade 15 for rotating the cutter blade 15. Specifically, the cutter blade 15 is coupled to the output axis 16a through a blade holder 32. The blade holder 32 is attached to the center of the cutter blade 15, and coupled to a lower end of the output axis 16a coaxially with the output axis 16a. Therefore, in the lawn mower 10A, the rotation axis a1 (rotation central line) of the cutter blade 15 is in alignment with the rotation core a of the output axis 16a (the rotation axis a1 of the cutter blade 15 is coaxial with the rotation core of the output axis 16a). Hereinafter, the rotation axis a1 of the cutter blade 15 will be referred to as the "blade rotation axis a1".

It should be noted that the blade rotation axis a1 need not necessarily be in alignment with the rotation core of the output axis 16a. For example, the blade rotation axis a1 may be provided in parallel with the rotation core, at a position offset toward the direction perpendicular to the rotation core of the output axis 16a. Alternatively, the blade rotation axis a1 may be provided in non-parallel with the rotation core of the output axis 16a.

The cutter blade 15 is a narrow member in the form of a plate (a so-called bar blade). The cutter blade 15 extends in a direction perpendicular to the blade rotation axis a1. Hereinafter, the longitudinal direction of the cutter blade 15 will also be referred to as the "radial direction". The rotation direction of the cutter blade 15 (indicated by the arrow R) may also be referred to as the "blade rotation direction". The direction opposite to the blade rotation direction may be referred to as the "reverse rotation direction". The blade rotation direction or the reverse rotation direction may be referred to as the "blade circumferential direction".

The cutter blade 15 includes a pair of blade arms 36 extending in opposite directions about the blade rotation axis a1. The pair of blade arms 36 are formed axially symmetrically about the blade rotation axis a1.

Figure 3:
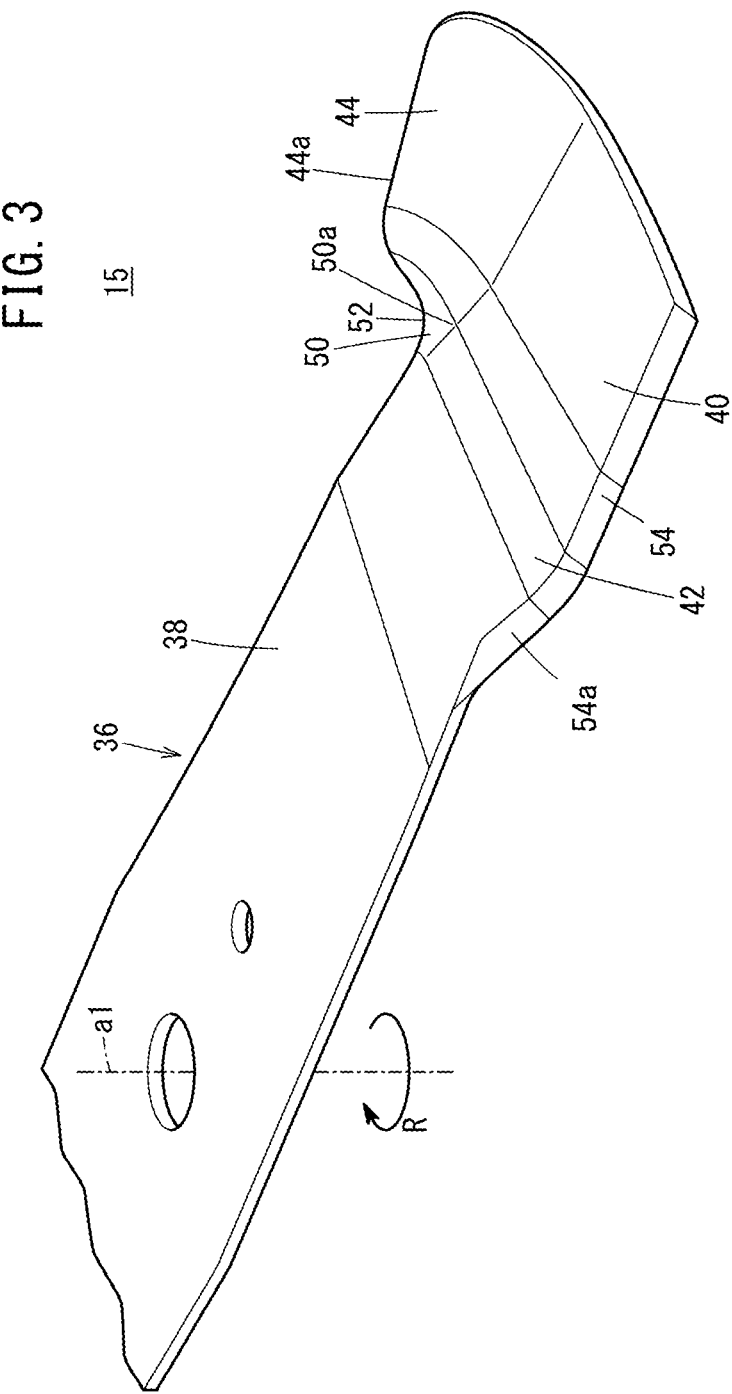
FIG. 3 is a perspective view showing a cutter blade mounted in the lawn mower.
Figure 4:
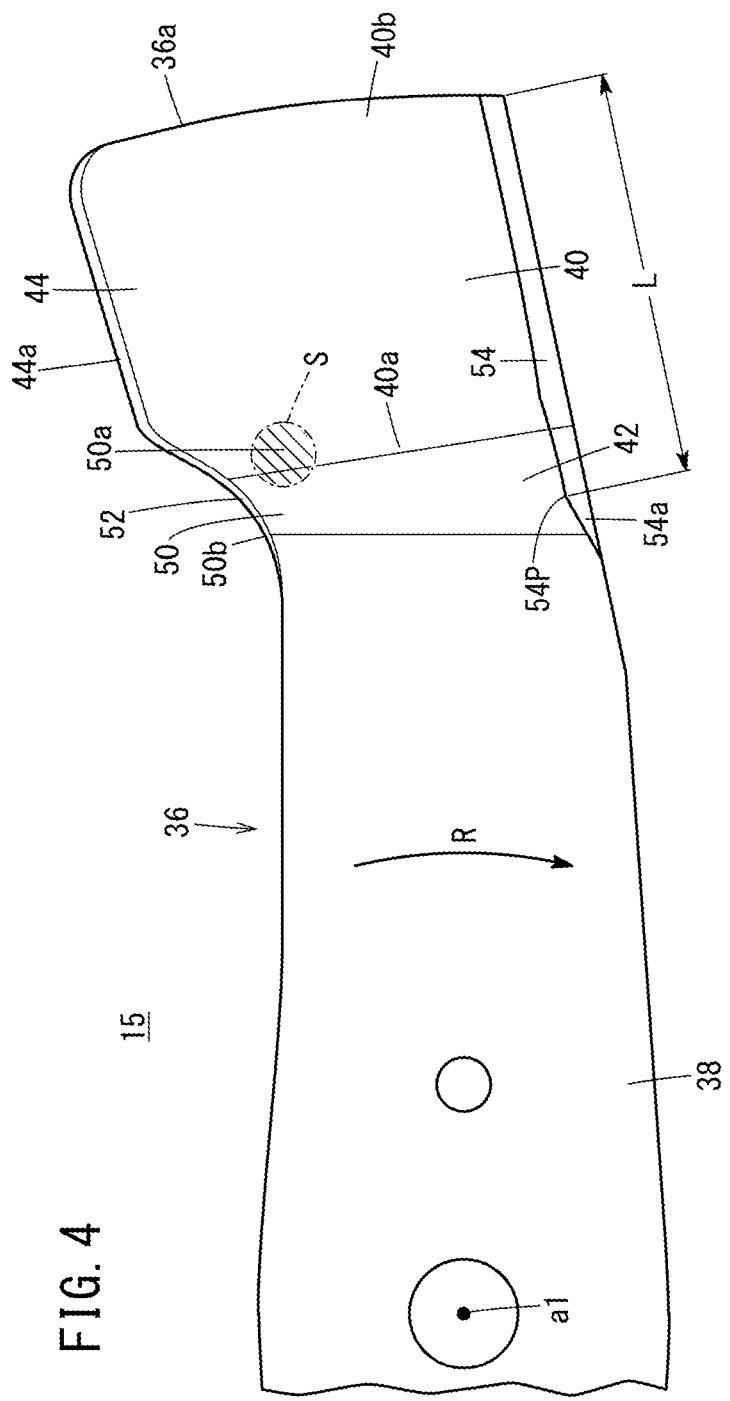
FIG. 4 is a plan view showing the cutter blade.

As shown in FIGS. 3 and 4, each of the blade arms 36 includes a blade proximal part 38 formed in the radial direction of the cutter blade 15, a clipping part 40 positioned outside the blade proximal part 38 in the radial direction (radially outside of the blade proximal part 38), a falling part 42 formed between the blade proximal part 38 and the clipping part 40, and a warping part 44 extending from the clipping part 40 in the reverse rotation direction.

Figure 5:
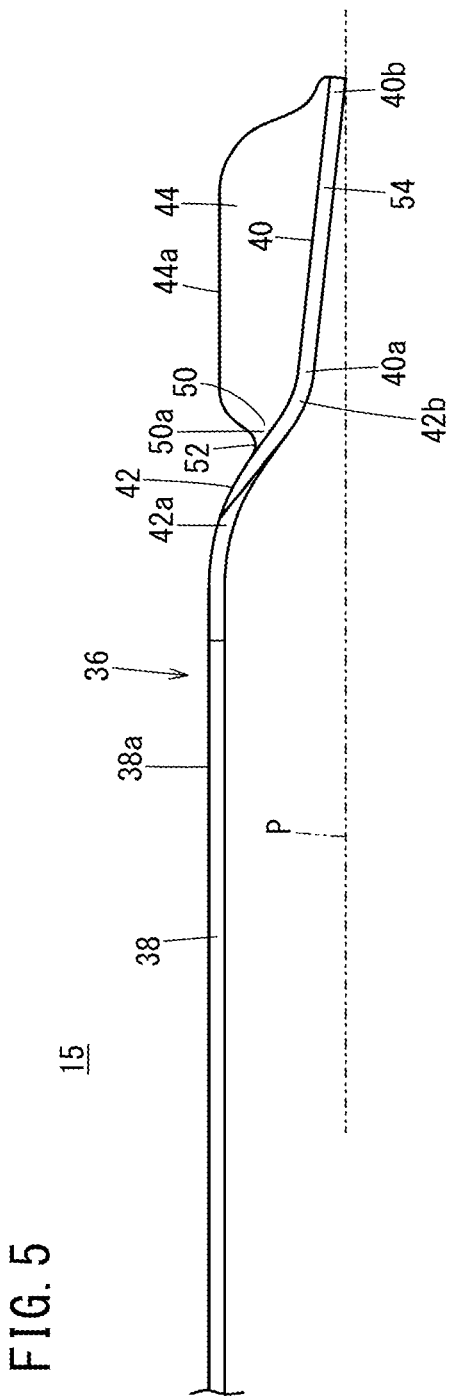
FIG. 5 is a side view showing the cutter blade as viewed from a blade circumferential direction of the cutter blade.

The blade proximal part 38 is formed in a flat plate shape extending in perpendicular to the blade rotation axis a1. The clipping part 40 is continuous from the radially outer end of the falling part 42, and is a radially outer area of the cutter blade 15. In FIG. 5, the clipping part 40 is positioned below the blade proximal part 38 and the falling part 42. The clipping part 40 is inclined downward toward the radial outside. Therefore, a radially outer end 40b of the clipping part 40 is positioned below a radially inner end 40a of the clipping part 40.

Figure 6:
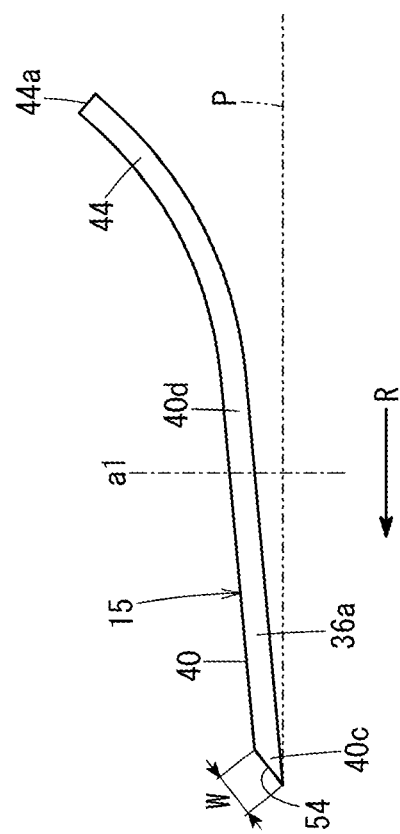
FIG. 6 is a side view showing an outer end of a cutter blade in a radial direction, as viewed inward in a radial direction.

The clipping part 40 is provided in non-parallel with the blade proximal part 38. Specifically, in FIG. 5, the clipping part 40 is inclined with respect to the surface P perpendicular to the blade rotation axis a1 in a manner that the clipping part 40 is oriented downward toward the radial outside. In FIG. 6, the clipping part 40 is inclined downward with respect to the surface P perpendicular to the blade rotation axis a1 in a manner that the clipping part 40 is oriented in the rotation direction. Therefore, an end 40c (front edge) of the clipping part 40 in the rotation direction is positioned below an end 40d of the clipping part 40 in the reverse rotation direction.

In FIGS. 3 to 5, the falling part 42 is a portion which is curved downward from the blade proximal part 38 toward the radial outside. The falling part 42 is continuous with the radially inner end 40a of the clipping part 40.

In FIG. 5, the falling part 42 is curved in an S-shape between the blade proximal part 38 and the clipping part 40. That is, a radially inner end 42a of the falling part 42 has a curve in an arc shape having the center of curvature on the lower side of the cutter blade 15 as viewed in the blade circumferential direction. A radially outer end 42b of the falling part 42 has a curved shape having the center of curvature on the upper side of the cutter blade 15 as viewed in the blade circumferential direction (hereinafter referred to as the "first curved shape").

In FIGS. 3 and 4, the warping part 44 protrudes beyond the blade proximal part 38 in the reverse rotation direction. The warping part 44 is formed to rise from the clipping part 40 in the reverse rotation direction. An upper end 44a of the warping part 44 extends along (substantially in parallel with) a blade part 54 as viewed in the axial direction of the blade rotation axis a1. The warping part 44 has a twisted shape which rises upward in the reverse rotation direction, and which is curved radially inward.

As shown in FIGS. 3 and 6, the warping part 44 has a shape curved to include an arc (hereinafter referred to the "second curved shape") oriented upward in the reverse rotation direction. The second curved shape of the warping part 44 may include a plurality of circular arcs having different curvatures. The curvature of the warping part 44 is increased radially outward. Therefore, the curvature in the radially outer portion of the warping part 44 is larger than the curvature in the radially inner portion of the warping part 44.

In FIG. 5, the upper end 44a (rear edge in the reverse rotation direction) of the warping part 44 is in substantially parallel with the cutter blade 15 in the radial direction (surface P perpendicular to the blade rotation axis a1). The rising height of the warping part 44 from the clipping part 40 is increased toward the radial outside. The upper end 44a of the warping part 44 is provided at a position below an upper surface 38a of the blade proximal part 38. The upper end 44a of the warping part 44 may be provided at the same height as the upper surface 38a of the blade proximal part 38 or above the upper surface 38a of the blade proximal part 38.

In FIGS. 3 to 5, the falling part 42 and the warping part 44 include an intersection part (overlapping area) 50 where an end of the falling part 42 in the reverse rotation direction and an end of the warping part 44 positioned radially inside intersect with each other. That is, the falling part 42 and the warping part 44 share the intersection part 50.

Specifically, the intersection part 50 includes a cup shaped portion 50a on an upper surface of the cutter blade 15. The cup shaped portion 50a is recessed toward the lower surface of the cutter blade 15. The cup shaped portion 50a has a shape formed by combining the first curved shape of the falling part 42 and the second curved shape of the warping part 44. Therefore, the cup shaped portion 50a has a spherical surface. In FIG. 4, an area S where the cup shaped portion 50a is formed is denoted by hatching.

In FIG. 4, the shape of a marginal portion 52 of the cutter blade 15 in the intersection part 50 has an arc shape (circular arc shape in FIG. 4) recessed (curved) toward the clipping part 40 as viewed in the axial direction of the blade rotation axis a1. The shape of the marginal portion 52 as viewed in the axial direction may include a plurality of circular arcs having different curvatures.

In FIG. 5, the shape of the marginal portion 52 of the cutter blade 15 at the intersection part 50 has an arc shape recessed (curved) downward as viewed in the blade circumferential direction. It should be noted that the shape of the marginal portion 52 viewed in the blade circumferential direction may be formed to include a plurality of circular arcs having different curvatures. The intersection part 50 is positioned above the clipping part 40.

At each of both ends of the cutter blade 15, the blade part 54 having a sharp blade edge is formed at the front edge in the rotation direction. As shown in FIG. 4, the blade part 54 has a straight shape as viewed in the axial direction of the blade rotation axis a1. In the illustrated example, the blade part 54 is formed over the entire front edge of the clipping part 40, and a radially inner end 54a of the blade part 54 is formed at the front edge of the falling part 42. Therefore, as shown in FIG. 5, the blade part 54 is curved at a position connecting the clipping part 40 and the falling part 42.

In FIG. 4, a radially inner end 50b of the intersection part 50 is positioned radially inside a radially inner end position 54P of the effective blade part length L of the blade part 54. That is, the position of the radially inner end 50b of the intersection part 50 is offset radially inward from the radially inner end position 54P of the effective blade part length L of the blade part 54. The blade width W of the blade part 54 in the range of the effective blade part length L (see FIG. 6) is substantially constant. In the blade part 54, the blade width of the radially inside part compared to the range of the effective blade length L is decreased toward the radial inside (FIG. 4).

In FIG. 4, the cutter blade 15 has a shape with a sweepback angle inclined in a reverse rotation direction of the cutter blade 15 (anti-clockwise in a plan view) with respect to the radiation direction about the blade rotation axis a1. That is, the cutter blade 15 (pair of blade arms 36) is curved or bent in the reverse rotation direction of the cutter blade 15 (opposite to the direction indicated by an arrow R), at an intermediate position between the blade rotation axis a1 and an outer end 36a of the cutter blade 15. It should be noted that the cutter blade 15 may have a shape which does not include any sweepback angle (shape extending straight in the radial direction).

Next, operation of the lawn mower 10A having the above structure will be described.

In FIG. 1, when the cutter blade 15 is rotated under operation of the prime mover 16, the cutter blade 15 cuts (clips) lawn grass grown on the lawn ground right under the lawn mower 10A. The clipped lawn grass (grass clippings) is swirled by the transportation wind (swirl wind) produced by rotation of the cutter blade 15, and transported to the grass clippings container 20 through the grass clippings discharge passage 13 formed in the housing 12.

During rotation of the cutter blade 15, the cutter blade 15 generates upward air flow by the warping part 44. Therefore, by generating the upward air flow to orient the lawn grass growing on the lawn ground to stand upright, it is possible to cut (clip) the lawn grass by the cutter blade 15 efficiently. Further, after the lawn grass (grass clippings) cut by the cutter blade 15 is lifted upward, and swirled in the housing 12 by the transportation wind, i.e., upward air flow and the swirl air flow generated by the warping part 44, the lawn grass can be transported into the grass clippings container 20 efficiently.

In this case, the lawn mower 10A including the cutter blade 15 offers the following advantages.

In the cutter blade 15 of the lawn mower 10A, as shown in FIGS. 3 to 5, the falling part 42 and the warping part 44 include the intersection part 50 where the end of the falling part 42 in the reverse rotation direction and the end of the warping part 44 positioned radially inside intersect with each other. In the structure, it becomes possible to catch long lawn grass and/or wet heavy lawn grass clipped by the clipping part 40 in the intersection part 50 where the falling part 42 and the warping part 44 intersect with each other. Therefore, after the clipped lawn grass is caught in the intersection part 50 temporarily, it becomes possible to transport the lawn grass by the transportation wind efficiently.

In particular, the intersection part 50 has the cup shaped portion 50a on the upper surface of the cutter blade 15. The cup shaped portion 50a is recessed toward the lower surface of the cutter blade 15. In the structure, it becomes possible to catch long lawn grass and/or wet heavy lawn grass clipped by the blade part 54 in the intersection part 50. Further, since the cup shaped portion 50a has the spherical surface, it becomes easier to catch long lawn and/or wet heavy lawn clipped by the blade part 54 in the intersection part 50 more suitably.

The marginal portion 52 of the cutter blade 15 in the intersection part 50 has an arc shape as viewed in the direction of the blade rotation axis a1. Further, the shape of the marginal portion 52 of the cutter blade 15 in the intersection part 50 has an arc shape recessed downward, as viewed in the blade circumferential direction. In the structure, it becomes possible to reduce the air resistance during rotation of the blade, and reduce noises such as wind noises.

The warping part 44 has a shape which rises upward in the reverse rotation direction, and which is curved radially inward. In the structure, it is possible to generate the transportation wind more efficiently.

The clipping part 40 is inclined downward toward the radial outside, and the upper end 44a of the warping part 44 is formed substantially in parallel with the radial direction. In the structure, it becomes possible to generate the transportation wind more efficiently.

The rising height of the warping part 44 from the clipping part 40 is increased toward the radial outside. In the structure, it is possible to generate the transportation wind more efficiently.

The radially inner end 50b of the intersection part 50 is positioned radially inside with respect to the radially inner end position 54P of the effective blade part length L of the blade part 54. In the structure, it is possible to catch the lawn grass clipped by the radially inner end of the blade part 54 in the intersection part 50 suitably.

As in the case of the lawn mower 10A (FIG. 1, etc.), a lawn mower 10B having another structure in FIG. 7 is a walk-behind, self-propelled working machine for cutting lawn grass. The lawn mower 10B is different from the lawn mower 10A in respect of structure of a cutter blade 60. The cutter blade 60 includes an upper blade 60A and a lower blade 60B that are overlapped with each other in the thickness direction. That is, the cutter blade 60 is in the form of double blades. The upper blade 60A and the lower blade 60B are coupled together by a blade holder 32 in a manner that the upper blade 60A and the lower blade 60B are not rotatable relative to each other. Therefore, during rotation of the output axis 16a, the upper blade 60A and the lower blade 60B rotate together.

Figure 8:
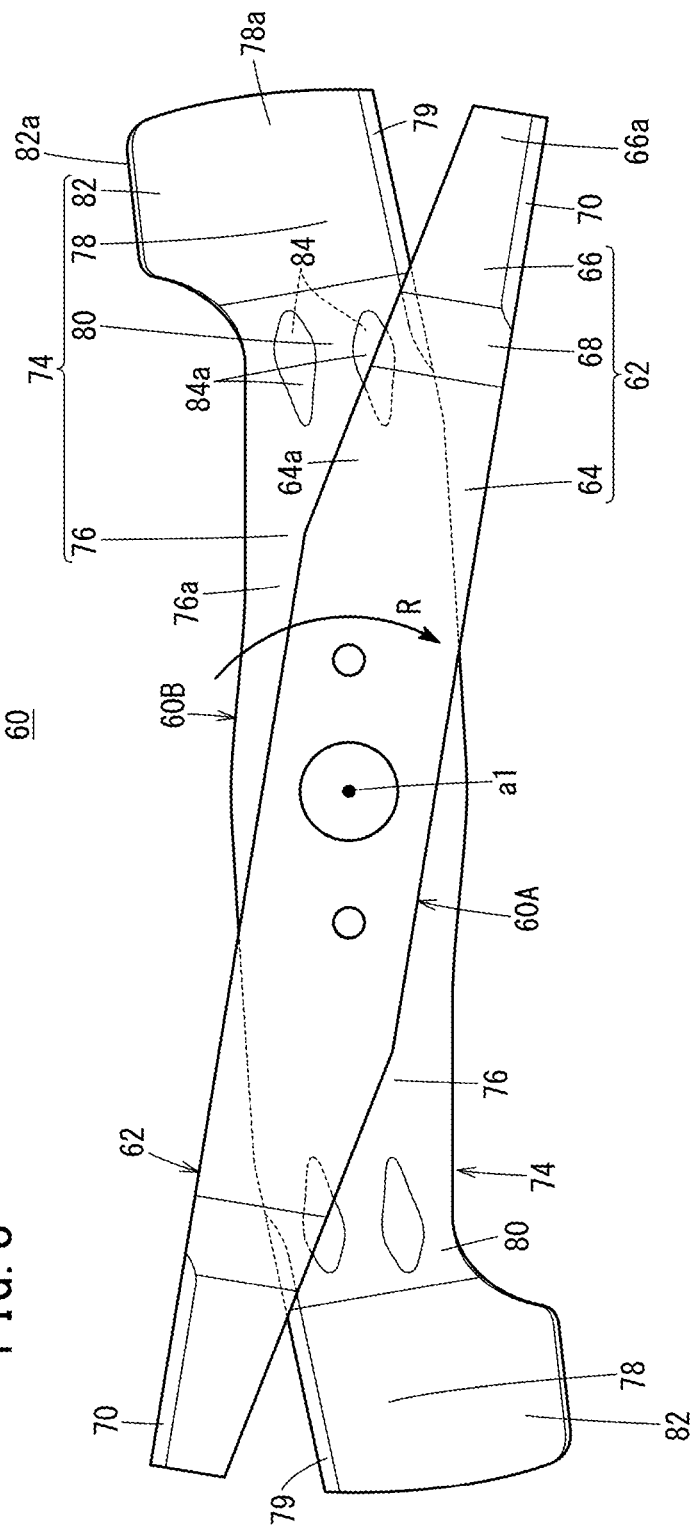
FIG. 8 is a plan view showing a cutter blade (having double blades) mounted in the lawn mower in the other structure.

As shown in FIG. 8, the cutter blade 60 has an axially symmetrical shape with respect to the blade rotation axis a1. The phase of the upper blade 60A is shifted from the phase of the lower blade 60B in the blade rotation direction (indicated by an arrow R). Therefore, as viewed in the axial direction of the blade rotation axis a1, the lower blade 60B and the upper blade 60A include an area where the lower blade 60B and the upper blade 60A are overlapped with each other, and an area where the lower blade 60B and the upper blade 60A are not overlapped with each other.

Figure 9:
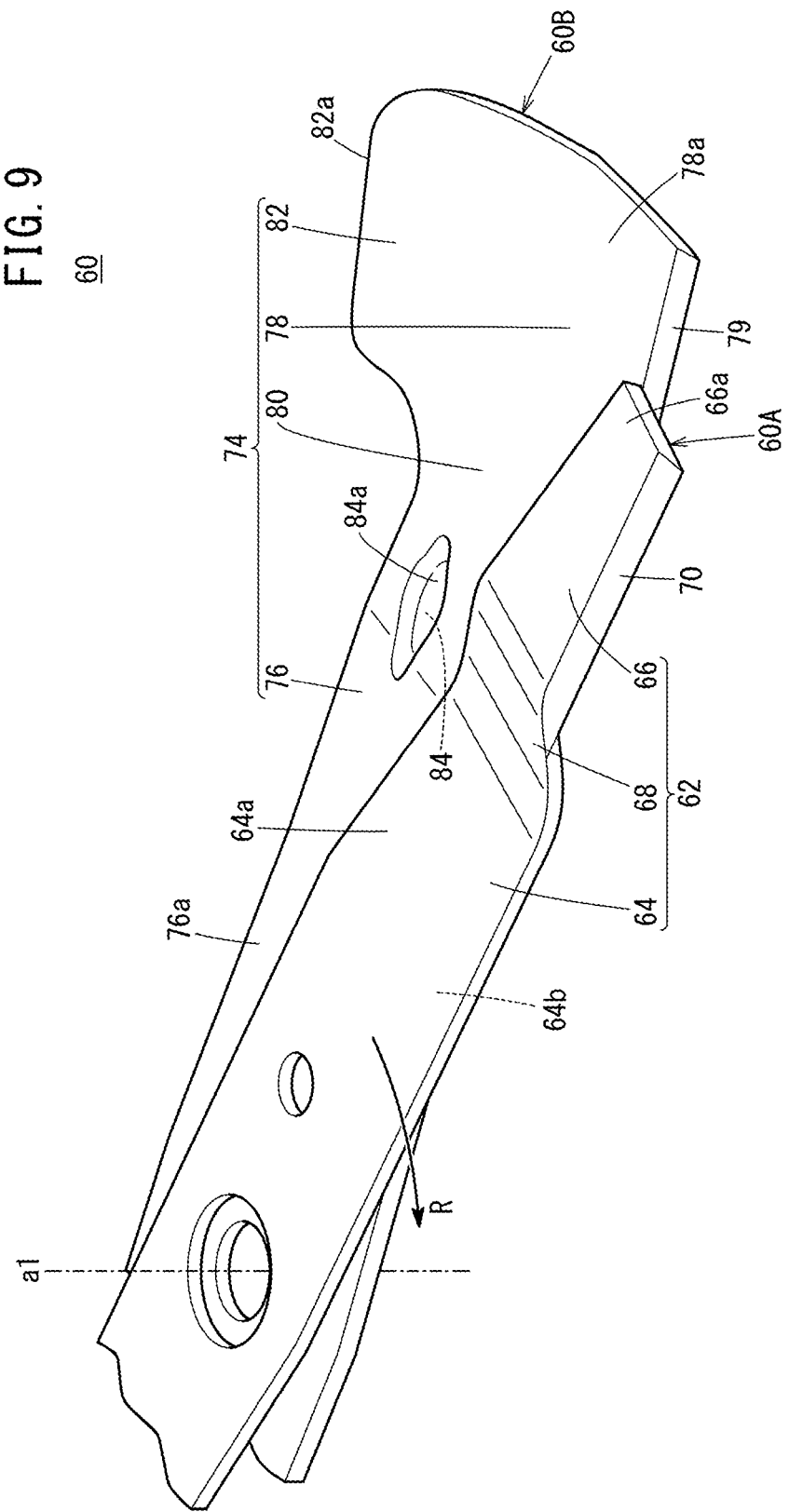
FIG. 9 is a perspective view showing the cutter blade (having double blades)

The upper blade 60A includes a pair of upper blade arms 62 extending in opposite directions from the blade rotation axis a1 at the center. In FIGS. 8 and 9, each of the upper blade arms 62 includes an upper blade proximal part 64, an upper outer end 66, and a rising part 68. The upper blade proximal part 64 has a flat shape in the radial direction perpendicular to the blade rotation axis a1. The upper outer end 66 is positioned radially outside the upper blade proximal part 64, and above the upper blade proximal part 64. The rising part 68 rises upward from the upper blade proximal part 64 toward the upper outer end 66.

The upper blade arm 62 has a shape where the blade width (width in the circumferential direction) is decreased toward the radial outside. Therefore, the blade width of the rising part 68 is smaller than the blade width of the upper blade proximal part 64. The blade width of the upper outer end 66 is smaller than the blade width of the rising part 68. Specifically, the rear edge of the upper blade arm (edge in the reverse rotation direction) is inclined in the blade rotation direction toward the radial outside. It should be noted that the blade width of the upper blade arm 62 may have a substantially constant shape toward the radial outside.

The upper blade proximal part 64 has a flat shape extending perpendicular to the blade rotation axis a1. The upper blade proximal part 64 is overlapped with a lower blade proximal part 76 of the lower blade 60B described later. That is, a lower surface 64b of the upper blade proximal part 64 contacts an upper surface 76a of the lower blade proximal part 76.

The upper outer end 66 is a portion extending from the radially outer end of the rising part 68 to the radial outside of the rising part 68. A blade part 70 having a sharp blade edge is provided at the front edge of the upper outer end 66 in the blade rotation direction. Therefore, the upper outer end 66 also functions as a clipping part for clipping lawn grass. As viewed in the axial direction of the blade rotation axis a1, the blade part 70 has a straight shape in parallel with the axis of the longitudinal direction of the upper blade 60A.

In the blade rotation direction, a radially outer end 66a of the upper outer end 66 is positioned on the front side of a radially outer end 78a of a clipping part 78 described later, of the lower blade 60B. In the blade rotation direction, the entire radially outer end 66a of the upper outer end 66 is not required to be positioned on the front side of the radially outer end 78a of the clipping part 78. It is sufficient that at least part of the radially outer end 66a of the upper outer end 66 is positioned on the front side of the radially outer end 78a of the clipping part 78. In this case, in the blade rotation direction, the upper outer end 66 should be positioned on the front side of a warping part 82 of the lower blade 60B described later.

Unlike the above described structure, in the case of adopting structure where the phase of the upper blade 60A is shifted from the phase of the lower blade 60B in the reverse rotation direction (opposite to the direction indicated by the arrow R), in the blade rotation direction, the radially outer end 78a of the clipping part 78 may be positioned closer to the front end, from the radially outer end 66a of the upper outer end 66.

Figure 10:
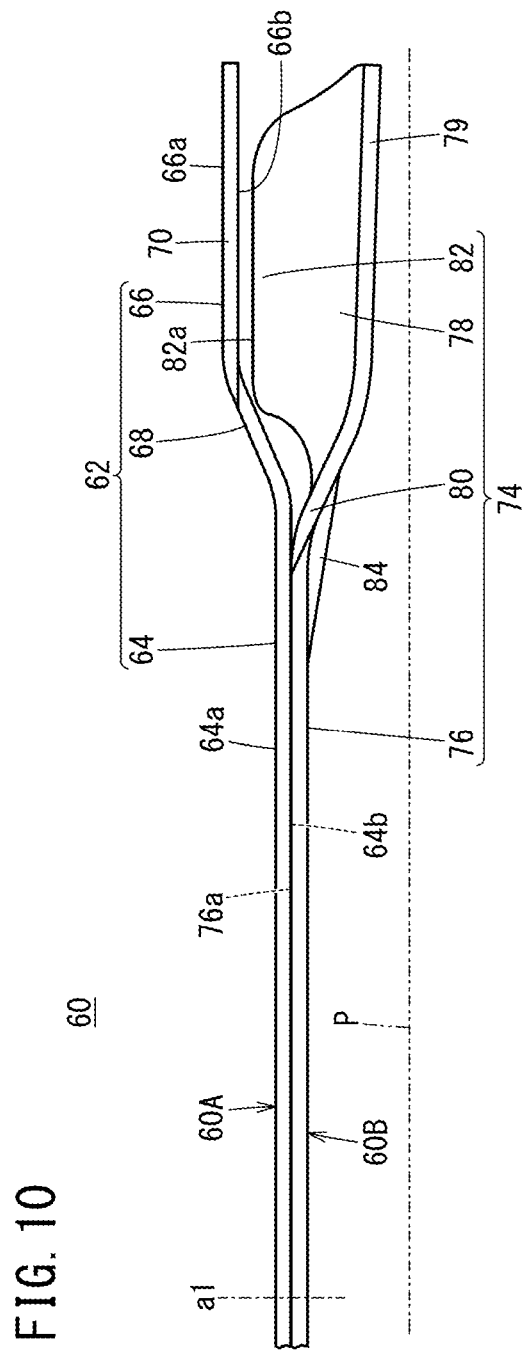
FIG. 10 is a side view showing the cutter blade (double blades) viewed in a circumferential direction of the blade.

In FIG. 10, the upper outer end 66 is provided in parallel with the upper blade proximal part 64. The upper outer end 66 may be provided in non-parallel with the upper blade proximal part 64. Therefore, the upper outer end 66 may be inclined with respect to the surface P in perpendicular to the blade rotation axis a1 in a manner that the upper outer end 66 is inclined downward or upward toward the radial outside. Alternatively, the upper outer end 66 may be inclined with respect to the surface P in perpendicular to the blade rotation axis a1 in a manner that the upper outer end 66 is inclined downward or upward in the blade rotation direction.

The rising part 68 forms a step (bent portion) between the upper blade proximal part 64 and the upper outer end 66. The rising part 68 is inclined upward, toward the radial outside. Therefore, a lower surface 66b of the upper outer end 66 is positioned above an upper surface 64a of the upper blade proximal part 64. Further, the rising part 68 may be a vertical part which extends from the upper blade proximal part 64 to the blade rotation axis a1, i.e., which stands upright in perpendicular to the upper blade proximal part 64. Alternatively, the rising part 68 may have an S-shaped curve as viewed in the blade circumferential direction.

The portion where the rising part 68 starts to rise from the upper blade proximal part 64 (portion connecting the upper blade proximal part 64 and the rising part 68), is positioned radially outside the portion where a falling part 80 described later starts to fall from the lower blade proximal part 76 (portion connecting the lower blade proximal part 76 and the falling part 80). That is, the radially inner end of the rising part 68 is positioned radially outside the radially inner end of the falling part 80.

The lower blade 60B includes a pair of lower blade arms 74 extending in opposite directions to each other on both sides of the blade rotation axis a1 at the center. Each of the lower blade arms 74 includes a lower blade proximal part 76, the clipping part 78, the falling part 80, and the warping part 82. The lower blade proximal part 76 has a flat shape in the radial direction. The clipping part 78 is positioned radially outside the lower blade proximal part 76, and positioned below the lower blade proximal part 76. The falling part 80 falls from the lower blade proximal part 76 toward the clipping part 78. The warping part 82 extends from the clipping part 78 in the reverse rotation direction.

The lower blade proximal part 76 has a flat plate shape extending perpendicular to the blade rotation axis a1. The clipping part 78 is continuous with the radially outer end of the falling part 80, and is a portion forming a radially outer area of the cutter blade 60. The front edge of the clipping part 78 in the blade rotation direction includes a blade part 79 having a sharp blade edge. In FIG. 10, the clipping part 78 is inclined downward, toward the radial outside.

The falling part 80 is a portion which is curved downward from the lower blade proximal part 76 toward the radial outside, and which forms a step (bent portion) between the lower blade proximal part 76 and the clipping part 78. The falling part 80 is continuous with the radially inner end of the clipping part 78. In FIGS. 8 and 9, a plurality of ribs 84 are provided on the lower surface of the falling part 80 for improving rigidity. The ribs 84 protrude downward, and are arranged at intervals in the blade circumferential direction. Recesses 84a as back surfaces of the ribs are provided on the upper surface of the falling part 80, at positions corresponding to the ribs.

In FIG. 9, the warping part 82 protrudes in the reverse rotation direction beyond the lower blade proximal part 76, and rises from the clipping part 78. The warping part 82 has an arc shape curved upward in the reverse rotation direction.

In FIG. 10, an upper end 82a (rear edge in the reverse rotation direction) of the warping part 82 is substantially in parallel with the radial direction of the cutter blade 60 (surface P perpendicular to the blade rotation axis a1). The upper end 82a of the warping part 82 is positioned above the upper surface 76a of the lower blade proximal part 76. It should be noted that the upper end 82a of the warping part 82 may be provided at the same height as the upper surface 76a of the lower blade proximal part 76 or below the upper surface 76a of the lower blade proximal part 76.

The upper end 82a of the warping part 82 is provided below the lower surface 66b of the upper outer end 66 of the upper blade 60A. It should be noted that the upper end 82a of the warping part 82 may be provided at the same height as the lower surface 66b of the upper outer end 66 of the upper blade 60A, or above the lower surface 66b of the upper outer end 66 of the upper blade 60A.

Next, operation of the lawn mower 10B having the above structure will be described.

In FIG. 7, when the cutter blade 60 is rotated under driving operation of the prime mover 16, the cutter blade 60 cuts (clips) lawn grass grown on the lawn ground right under the lawn mower 10B. The clipped lawn grass (grass clippings) is transported by the transportation wind (swirl wind) produced by rotation of the cutter blade 60 to the grass clippings container 20 through the grass clippings discharge passage 13 formed in the housing 12.

During rotation of the cutter blade 60, the cutter blade 60 generates an upward air flow by the warping part 82 of the lower blade 60B. In this manner, the upward air flow is generated to orient the lawn grass growing on the lawn ground to stand upright. Therefore, it is possible to cut (clip) the lawn grass by the cutter blade 60 efficiently. Further, after the lawn grass (grass clippings) cut by the cutter blade 60 is lifted upward, and swirled in the housing 12 by the transportation wind, i.e., upward air flow and the swirl air flow generated by the warping part 82, the lawn grass can be transported into the grass clippings container 20 efficiently.

In this case, the lawn mower 10B having the cutter blade 60 offers the following advantages.

As shown in FIGS. 8 to 10, the cutter blade 60 includes the upper blade 60A and the lower blade 60B overlapped with each other in the thickness direction. The upper blade 60A includes the upper blade proximal part 64 and the upper outer end 66. The upper blade proximal part 64 has a flat shape in the radial direction perpendicular to the blade rotation axis a1. The upper outer end 66 is positioned radially outside the upper blade proximal part 64, and above the upper blade proximal part 64. The lower blade 60B includes the lower blade proximal part 76 having a flat shape in the radial direction, and the clipping part 78 positioned radially outside the lower blade proximal part 76, and below the lower blade proximal part 76. Then, the upper blade proximal part 64 is overlapped on the lower blade proximal part 76.

With the structure, during rotation of the cutter blade 60, by the influence of the centrifugal force, a force is applied to the upper blade 60A to displace the upper blade 60A downward, and a force is applied to the lower blade 60B to displace the lower blade 60B upward to suppress displacement of the upper blade 60A and displacement of the lower blade 60B mutually. Therefore, it becomes possible to suppress displacement amount during rotation of the cutter blade 60 effectively. Accordingly, it becomes possible to improve, in particular, the finishing appearance (flatness of the lawn after clipping) as one of the features of the lawn mowing performance. Further, since stress generation by displacement is suppressed, it becomes possible to reduce requirements of rigidity and/or the strength of the upper blade 60A and the lower blade 60B.

The upper blade 60A includes the rising part 68 rising from the upper blade proximal part 64 to the upper outer end 66, and the lower blade 60B includes the falling part 80 falling from the lower blade proximal part 76 to the clipping part 78. Further, the position where the rising part 68 starts to rise from the upper blade proximal part 64 is positioned radially outside the position where the falling part 80 starts to fall from the lower blade proximal part 76 (FIG. 10). In the structure, during rotation of the cutter blade 60, the outermost portion of the lower blade proximal part 76 in the radial direction and the upper blade proximal part 64 push against each other. Therefore, it becomes possible to suppress the displacement amount of the lower blade 60B during rotation of the cutter blade 60 effectively to a greater extent. Since the displacement amount of the lower blade 60B is suppressed, it becomes possible to improve the finishing appearance to a greater extent.

In the blade rotation direction, one of the upper radially outer end 66a of the upper outer end 66 and the radially outer end 78a of the clipping part 78 is positioned on the front side of another of the upper radially outer end 66a of the upper outer end 66 and the radially outer end 78a of the clipping part 78 (FIG. 8). In the structure, it is possible to suppress cancellation of the air flows (wind) generated by the upper outer end 66 and the clipping part 78 during rotation of the cutter blade 60. Accordingly, it becomes possible to efficiently generate the transportation wind for transporting the clipped lawn grass.

In particular, in the case of the lawn mower 10B, the lower blade 60B includes the warping part 82 rising from the clipping part 78 in a direction opposite to the blade rotation direction. In the blade rotation direction, the radially outer end 66a of the upper outer end 66 is positioned on the front side of the radially outer end 78a of the clipping part 78 (FIG. 8). In the structure, during rotation of the cutter blade 60, it is possible to suppress cancellation of the upward air flow generated by the warping part 82 of the lower blade 60B, by the air flow generated by the upper outer end 66 of the upper blade 60A. Therefore, it becomes possible to generate the transportation wind more efficiently.

The blade part 70 is formed in at least part of the front edge of the upper outer end 66 in the blade rotation direction. In the structure, by clipping the lawn grass not only by the lower blade 60B but also by the upper blade 60A, it is possible to finely cut the lawn grass in comparison with the case of clipping the lawn grass only by the lower blade 60B. Therefore, even in the case of transporting long lawn grass and/or wet heavy lawn grass, the clipped lawn grass rides on the transportation wind easily, and the clipped lawn grass can be transported easily on the transportation wind more efficiently.

In the lawn mower 10B, it should be noted that the cutter blade 15 shown in FIG. 3, etc. may be adopted as the lower blade of the cutter blade 60, instead of the above described lower blade 60B. In this manner, in addition to the above advantages offered by the lawn mower 10B, the same advantages as in the case of the lawn mower 10A can be obtained. For example, after the long lawn grass and/or wet heave lawn grass clipped by the clipping part 78 is caught in the intersection part 50 (FIG. 3), it is possible to transport the lawn grass on the transportation wind efficiently.

The present invention is not limited to the above described embodiments. Various modifications can be made without deviating from the gist of the present invention.

The invention claimed is:

1. A cutter blade for a lawn mower, the cutter blade comprising an upper blade and a lower blade overlapped with each other in a thickness direction,
wherein the upper blade includes an upper blade proximal part having a flat shape in a radial direction perpendicular to a blade rotation axis and an upper outer end positioned radially outside the upper blade proximal part, and above the upper blade proximal part; and
the lower blade includes a lower blade proximal part having a flat shape in the radial direction, and a clipping part positioned radially outside the lower blade proximal part and below the lower blade proximal part,
wherein the upper blade proximal part is overlapped on the lower blade proximal part,
wherein the upper blade includes a rising part which rises from the upper blade proximal part toward the upper outer end; and
the lower blade includes a falling part which falls from the lower blade proximal part to the clipping part, and
wherein a portion where the rising part starts to rise from the upper blade proximal part is positioned radially outside a portion where the falling part starts to fall from the lower blade proximal part.

2. The cutter blade according to claim 1, wherein, in a blade rotation direction, one of a radially outer end of the upper outer end and a radially outer end of the clipping part is positioned on a front side of another of the radially outer end of the upper outer end and the radially outer end of the clipping part.

3. The cutter blade according to claim 1, wherein the lower blade comprises a warping part rising from the clipping part in a direction opposite to the blade rotation direction;
in a blade rotation direction, a radially outer end of the upper outer end is positioned on the front side of the radially outer end of the clipping part.

4. The cutter blade according to claim 1, wherein a blade part is formed in at least part of a front edge in a blade rotation direction of the upper outer end.

5. The cutter blade according to claim 1, wherein the lower blade includes the falling part formed between the lower blade proximal part and the clipping part, the falling part being curved downward from the lower blade proximal part toward the radial outside; and
a warping part formed to rise from the clipping part in a reverse rotation direction which is a direction opposite to the blade rotation direction, and
wherein the falling part and the warping part include an intersection part where an end of the falling part in the reverse rotation direction and an end of the warping part positioned radially inside intersect with each other.

6. A cutter blade for a lawn mower, the cutter blade comprising an upper blade and a lower blade overlapped with each other in a thickness direction,
wherein the upper blade includes an upper blade proximal part having a flat shape in a radial direction perpendicular to a blade rotation axis and an upper outer end positioned radially outside the upper blade proximal part, and above the upper blade proximal part; and
the lower blade includes a lower blade proximal part having a flat shape in the radial direction, and a clipping part positioned radially outside the lower blade proximal part and below the lower blade proximal part,
wherein the upper blade proximal part is overlapped on the lower blade proximal part,
wherein the lower blade includes a falling part formed between the lower blade proximal part and the clipping part, the falling part being curved downward from the lower blade proximal part toward the radial outside; and
a warping part formed to rise from the clipping part in a reverse rotation direction which is a direction opposite to the blade rotation direction, and
wherein the falling part and the warping part include an intersection part where an end of the falling part in the reverse rotation direction and an end of the warping part positioned radially inside intersect with each other, and
wherein the intersection part includes a cup shaped portion on an upper surface of the cutter blade, and the cup shaped portion is recessed toward a lower surface of the cutter blade.

7. The cutter blade according to claim 6, wherein the cup shaped portion has a spherical surface.

8. The cutter blade according to claim 5, a shape of a marginal portion of the cutter blade in the intersection part has an arc shape as viewed in a direction of the blade rotation axis.

9. The cutter blade according to claim 5, wherein the warping part has a twisted shape which rises upward in the reverse rotation direction, and which is curved radially inward.

10. A lawn mower including a cutter blade, the cutter blade comprising an upper blade and a lower blade overlapped with each other in a thickness direction,
wherein the upper blade includes an upper blade proximal part having a flat shape in a radial direction perpendicular to a blade rotation axis; and an upper outer end positioned radially outside the upper blade proximal part, and above the upper blade proximal part; and
the lower blade includes a lower blade proximal part having a flat shape in the radial direction, and a clipping part positioned radially outside the lower blade proximal part and below the lower blade proximal part,
wherein the upper blade proximal part is overlapped on the lower blade proximal part,
wherein the upper blade includes a rising part which rises from the upper blade proximal part toward the upper outer end; and
the lower blade includes a falling part which falls from the lower blade proximal part to the clipping part, and
wherein a portion where the rising part starts to rise from the upper blade proximal part is positioned radially outside a portion where the falling part starts to fall from the lower blade proximal part.

11. The lawn mower according to claim 10, wherein the lower blade comprises:
the falling part formed between the lower blade proximal part and the clipping part, the falling part being curved downward from the lower blade proximal part, toward the radially outside; and
a warping part formed to rise from the clipping part in a reverse rotation direction which is a direction opposite to a blade rotation direction, and
wherein the falling part and the warping part include an intersection part where an end of the falling part in the reverse rotation direction and an end of the warping part positioned radially inside intersect with each other.

* * * * *